United States Patent [19]

Ibrahim

[11] Patent Number: 5,557,509
[45] Date of Patent: Sep. 17, 1996

[54] POWER SUPPLY FILTER SYSTEM FOR POWER SUPPLY SYSTEM FOR A COMMUNICATIONS SUBSYSTEM OF A WEAPONS SYSTEM

[75] Inventor: Sobhy Ibrahim, Munich, Germany

[73] Assignee: Siemens Aktiengesellschaft, Munich, Germany

[21] Appl. No.: 279,112

[22] Filed: Jul. 22, 1994

[30] Foreign Application Priority Data

Aug. 9, 1993 [DE] Germany .................. 43 26 734.3

[51] Int. Cl.⁶ ............................................ H02M 1/12
[52] U.S. Cl. .......................... 363/44; 363/67; 307/86
[58] Field of Search ...................... 363/44, 45, 46, 363/47, 48, 67, 69, 70; 307/39, 85, 86, 87

[56] References Cited

U.S. PATENT DOCUMENTS

| | | |
|---|---|---|
| 4,314,322 | 2/1982 | Plow et al. .................... 363/46 |
| 4,725,739 | 2/1988 | McCartney et al. . |
| 4,868,732 | 9/1989 | Gillett et al. .................... 363/45 |
| 5,134,307 | 7/1992 | Nakano ........................ 307/87 |
| 5,165,055 | 11/1992 | Metsler . |

*Primary Examiner*—Peter S. Wong
*Assistant Examiner*—Y. Jessica Han
*Attorney, Agent, or Firm*—Hill, Steadman & Simpson

[57] ABSTRACT

A power supply system for a subsystem in a weapons system, having a filtering arrangement divided into three stages, the first stage providing coarse filtering for the subsystem, a second stage providing filtering for each of a plurality of sub-areas of the subsystem for filtering signals to individual devices within a given subarea.

4 Claims, 3 Drawing Sheets

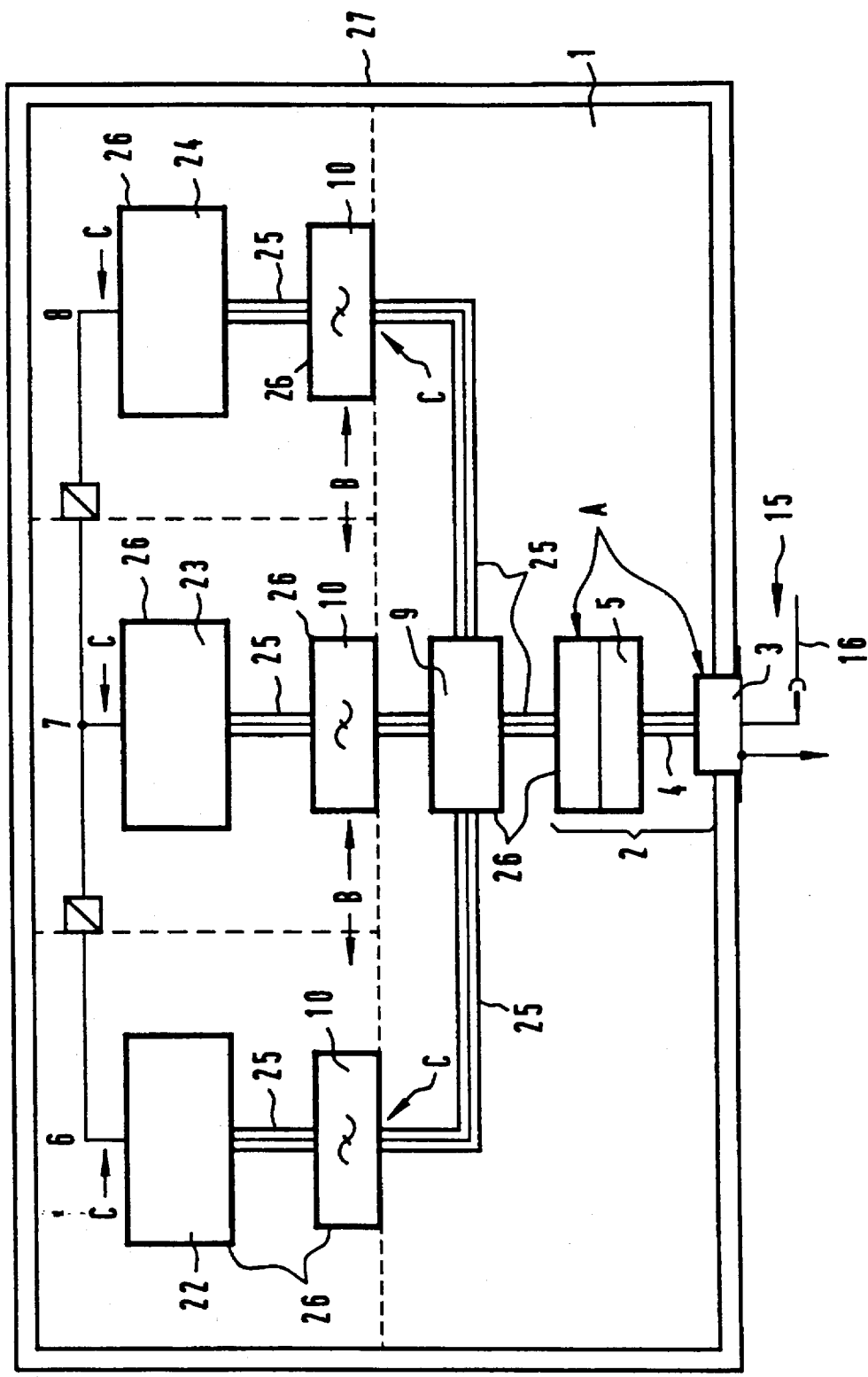

POWER SUPPLY FILTER SYSTEM FOR POWER SUPPLY SYSTEM FOR A COMMUNICATIONS SUBSYSTEM OF A WEAPONS SYSTEM

BACKGROUND OF THE INVENTION

The present invention generally relates to power supply systems. More specifically, the invention is directed to a filtering system for a power supply system for a communication subsystem of a weapons system.

Extremely high electro-magnetic compatibility (EMC) demands are made of complex weapons systems, for example, those which have complicated electronics, and these demands generally can only be met with great difficulty, and, usually, with an extremely high outlay in terms of costs and/or components. Strict regulations or design rules must be observed with respect to the intensity of low-frequency, directed emissions having low amplitudes as well as of directed emissions at the output terminals of devices for DC and AC loads, respectively; with respect to the interference sensitivity to directed energy and needle pulses on power supply lines; with respect to radiated emissions for broad band and narrow band magnetic fields; and, above and beyond this, with respect to the interference susceptibility to irradiated energy pertaining both magnetic induction fields as well as electrical fields. Further, a prescribed tolerance for interference susceptibility to short pulses in the nanosecond range and for the insertion attenuation between individual regions of the subsystems must be observed. Moreover, all telecommunication components for mobile use must be protected against nuclear electro-magnetic pulses (NEMP), the degree of protection being based on the demands of the apparatus typical of the weapons system. Telecommunication booths are protected by suitable filters for the cables, antennae, etc.

SUMMARY OF THE INVENTION

The invention disclosed herein provides a filtering arrangement for the power supply system for a subsystem such as those described above. In accordance with the invention, first, a lowering of outgoing electro-magnetic interference, both line bound as well as radiant, to within a prescribed limit is achieved and, second, effective protection against discrete pulses from high tension network transient over-voltages or surges is achieved, so that all apparatus and subsystems can simultaneously work interference free in an electromagnetic compatibility sense, whereby the filtering arrangement is not active against compromising emissions or, respectively, protection against tapping.

In an embodiment, the invention provides a power supply system for a communications subsystem of a weapons system, comprising:

- a source of alternating current power external to the subsystem;
- a mains connection in the subsystem which is electrically coupled to the external source of power;
- a transformer electrically coupled to the mains connection;
- a distributor electrically coupled to the transformer and configured to distribute power from the transformer into a plurality of sub-power lines;
- a converter in each of the sub-power lines for converting the power supplied thereto into a DC power signal;
- a first filter stage provided within the subsystem, the first filter having stage means for removing current surges, voltage surges and electro-magnetic particle field influences in the mains connection and transformer;
- a second filter stage comprising a power line filter positioned in each sub-power line, the second stage filters isolating the various sub-power lines from one another; and
- a third filter stage comprising means for noise signals and interfering signals from the various devices from each other.

In an embodiment, the invention provides that an inverter is connected in one of the sub-power lines following the converter therein.

In an embodiment, the invention provides the third filter stage means for filtering noise signals and interference signals from the various devices from one another comprises appropriately coupled low pass filters, series inductances and shunt capacitors and shunt resistors.

These and other features of the invention are described below in the following detailed description of the presently preferred embodiments with reference to the accompanying drawings.

BRIEF DESCRIPTION OF THE DRAWINGS

FIG. 3 illustrates a block diagram of a shielded and filtered power supply circuit implementing principles of the invention for a booth of a radio link subsystem of a complex weapons system.

DETAILED DESCRIPTION OF THE PRESENTLY PREFERRED EMBODIMENTS

As set forth in the summary above, the present invention provides a filtering arrangement for filtering the power supplied to components of a subsystem of a complex weapons system. Such a filtering system comprises three filter stages.

Figure 1:
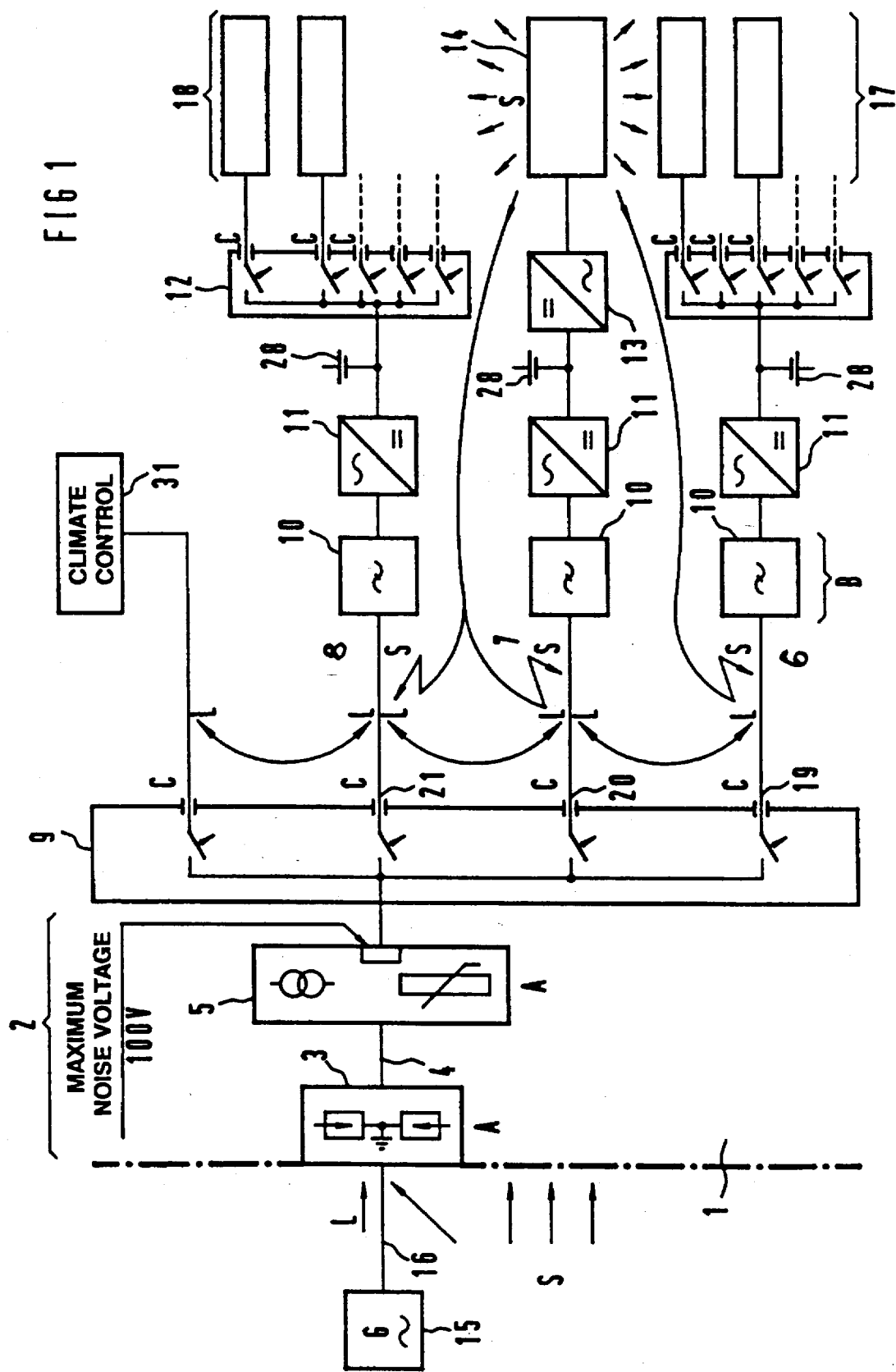
FIG. 1 illustrates a schematic diagram of a power supply system embodying principles of the invention.

In FIG. 1, there is illustrated a schematic diagram of an exemplary embodiment of a power supply system embodying principles of the invention for a mobile subsystem of a weapons system, for example, a radio link subsystem built into a booth 1. This power supply system is supplied source power via a line 16 from an AC power generating unit 15. A mains connection unit 2 of the subsystem, comprised of a mains box 3, an NEMP cable 4 and an inner stage transformer 5 is coupled to a source power input of the subsystem so as to be connected or connectable to the power generating unit 15, as is appropriate.

The mains connection unit 2 is in turn electrically followed by an alternating current switch and distributor unit 9 for distributing the source power into three sub-areas: a telecommunication area; a root logic/radio interface unit area; and a radio communication area, as well as for separately supplying source power to an air conditioning unit 31. The power supplied into the three sub-areas then is subdivided into three decoupled or isolated electro-magnetic compatibility (EMC) areas; a telecommunication area 6; a root logic/radio interface unit area 7; and a radio communication area 8.

As can be appreciated, the separation of the areas 6, 7 and 8 is realized or accomplished by employing suitable shielded housings, cable shields, filters and similar measures during the design stage of the subsystem. It will be further appreciated that the majority of the devices in the subsystem discussed in this exemplary embodiment will work with direct current of approximately 24 volts.

As further illustrated, three filter stages are employed to filter the power supplied from the source power 15 to the various devices, namely, a coarse protection filter stage A, an area decoupling or isolating stage B, and a fine protection stage C. These filtering stages are described next.

With reference still to FIG. 1, in the illustrated embodiment, the coarse protection filter stage A is provided in the mains connection unit 2 and, more particularly, in the mains box 3 and interstage transformer 5 therein. As will be appreciated, the coarse protection filter stage A serves to suppress or otherwise divert surge current in the source power given surge voltage waves as typically occur, for example, during lightening storms. Moreover, EMP and NEMP pulses are quickly removed with this filter stage A. In the presently preferred embodiment, it is taken into consideration or should be taken into consideration when designing the coarse protection filter stage A that a maximum noise voltage of, for example, 100 volts dare not be exceeded at the output of the interstage transformer 5. The removal or destruction of the pulses is accomplished by utilizing the following components operatively connected in the mains connection unit 2: a high current discharger, a wipe-out discharger, spike chokes, in-rush current limiters, varistors, and lead-through filters.

With respect to the filter stage B, power line filters 10 are respectively arranged in alternating current supply paths in the sub-areas 6, 7 and 8, where these filters 10 serve to lower outgoing electro-magnetic interferences and to effectively protect the respective sub-areas from discrete pulses in the high current network. In addition, the filters 10 isolate or otherwise decouple the three EMC sub-areas 6, 7 and 8 to such an extent that a given area is not subject to interferences from the other two areas. Thus, given outage of one of the three areas, 6, 7 and 8, the other two areas continue to work independently from one another and from the area subjected to outage.

The power line filters 10, which also represent the area decoupling filter stage B, also serve the purpose of suppressing or flattening edges of over-voltages or surges that occur due to great voltage rises, particularly given lightening strikes. Moreover, a limitation of noise voltage to a maximum voltage value given a specific nominal voltage is achieved with these filters, a maximum output peak voltage deriving therefrom at the filter output.

As illustrated, rectifiers 11 electrically follow the power line filters 10 in each of the three sub-areas 6, 7 and 8, each of these rectifiers 11 generating a DC voltage of approximately 24 volts for its respective sub-area 6, 7 or 8. In the sub-area 6, a direct current switch and distributor unit 12 follows its rectifier 11, this distributor 12 distributing the 24 volts supply voltage to various telecommunication assemblies 17. In the radio communication area 8, the rectifier 11 is followed by a similar direct current switch and distributor unit 12 that then distributes the DC supply power to various radio assemblies 18. In the route logic/radio communication interface area 7, an inverter 13 follows the rectifier 11 instead of a distributor 12, because devices 14 of the route logic/radio communication interface area must be supplied with alternating current.

Devices comprising the fine protection filter stages C are fundamentally integrated into the alternating current switch and distributor unit 9 as well as into the direct current switch and distributor units 12, at the jack departures thereof. The stages C eliminate interfaces or, respectively, noise voltages and currents (both alternating voltages and currents as well as direct voltages and currents) that come from the devices to be supplied with power. All 24-volt direct current apparatus are protected on the power supply and distribution level, that is, for example, the rectifier 11, buffer batteries 28 and the direct current switch and distributor units 12 of the subsystem, against master switch (MS) pulses and against interference emissions of MS pulses, by the fine protection filter stages C.

As will become clearer below, the telecommunication area 6 which begins at an output 19 of the alternating current switch and distributor unit 9 has a plurality of device filters that are integrated following the output of the alternating current switch and distributor unit 9 or, respectively, at the output of the direct current switch and distributor unit 12 that form the fine protection filter stage C therein. The area 6 also has a power line filter 10 that serves as an area decoupling or isolating filter stage B. This type of filter arrangement connected successively in the power supply chain reduces the interferences as well as intrinsic interferences (for example, noise voltage or noise current) to within the permissible prescribed system limit values.

The route logic/radio communication interface unit area 7, which begins after an output 20 of the alternating current switch and distributor unit 9 therein, has a plurality of device filters in a power supply unit serving as the fine protection filter stage C, these being integrated at the input, or, respectively, output of the rectifier 11, inverter 13 and the route logic/radio communication device 14. The area 7 also has a power line filter 10 serving as the area isolating filter stage B. The conversion in the rectifier 11 and the inversion in the inverter 13 also assures that no data signals are transferred back into the network due to compromising emissions.

The radio communication unit 8, which begins after an output 21 of the alternating current switch and distributor unit 9, likewise comprises a plurality of device filters in a power supplied unit, serving as the fine protection filter stage C therein. These device filters are integrated at the input of the power supply device containing the rectifier 11 and at the output of the direct current switch and distributor unit 12 therein. Area 8 also has a power line filter 10 serving as the isolating filter stage B.

Figure 2:
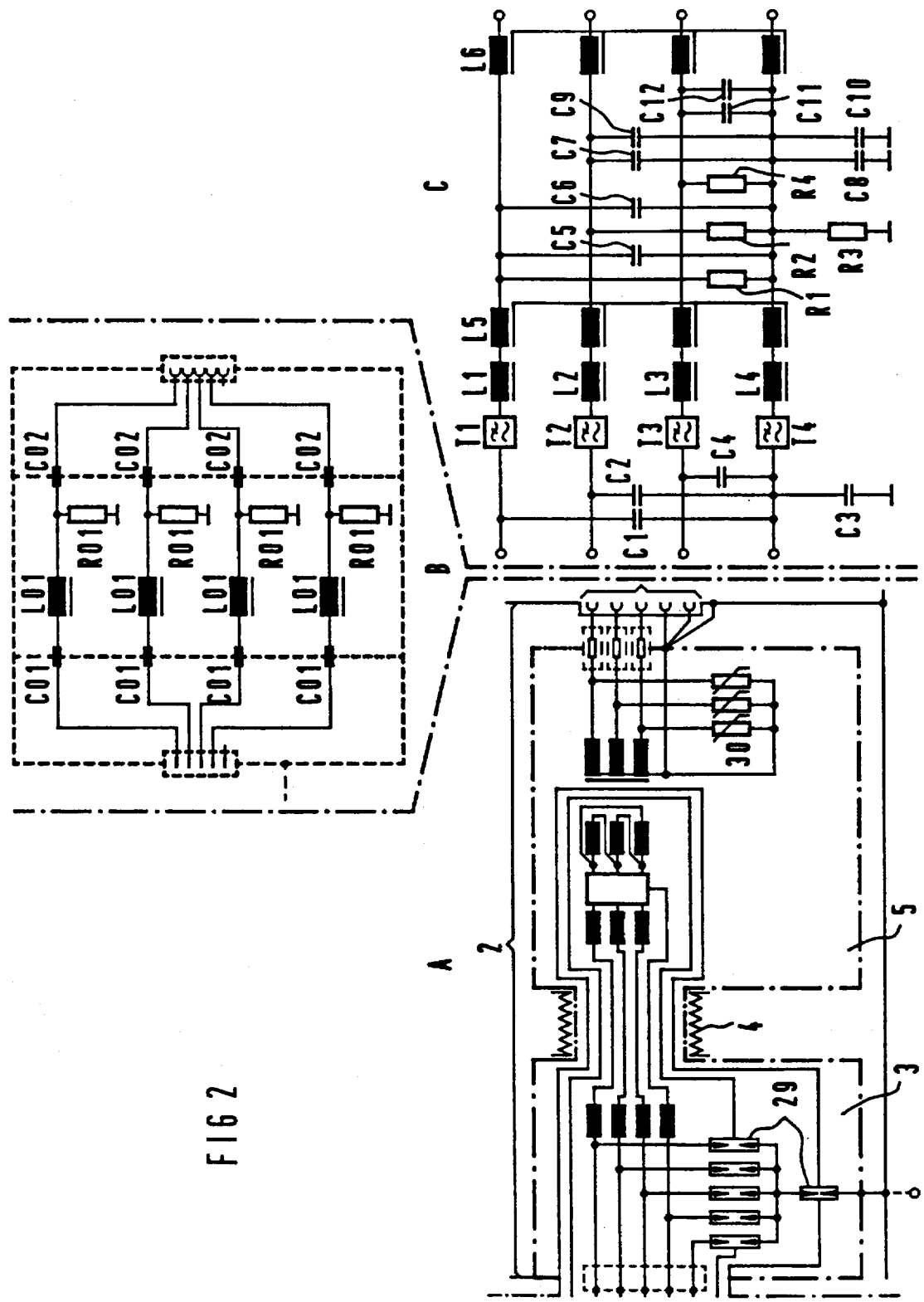
FIG. 2 illustrates exemplary embodiments of filtering arrangements set forth in FIG. 1.

With reference now to FIG. 2, therein there is illustrated in greater detail an arrangement of the various filter stages described above, including the components forming same.

On the left-hand side of FIG. 2, there is illustrated the mains connection unit 2 with its mains box 3, the NEMP cable 4 and the interstage transformer 5. As illustrated, high voltage wipe-out dischargers 29 are provided, among other things, in the mains box while discharge varistors 30 are provided in the interstage transformer 5. The discharges 29 are coupled between the incoming power supply and ground. The varistors 30 similarly are coupled between the outgoing power and ground.

In the middle portion of FIG. 2, there is illustrated an example of a power line filter 10 that can serve as an area isolating filter stage B. This power line filter is comprised of a series of in-line inductances LO1, shunt resistors RO1 and shunt capacitors CO1 and CO2 in the form of lead-through capacitors.

At the right side of FIG. 2, there is illustrated an exemplary circuit of a device filter that can serve as a fine protection filter stage C. This device filter is comprised of in-line low pass filter elements T1–T4, series inductances L1–L6, shunt capacitors C1–C12 and shunt resistors R1–R4.

In a schematic block diagram, FIG. 3 illustrates the isolation of the various areas of the power supply system in accordance with principles of the invention. As illustrated, the separate power line filters 10 for area isolation and power supply units 22, 23 and 24, with rectifiers and battery units are provided for each of the three areas, 6, 7 and 8. The direct current switch and distributor units are respectively contained in the power supply units 22 and 24 of the telecommunication area 6, and, respectively, of the radio communication area 8. As described above, an inverter is supplied in the power supply unit 23 of the route logic/radio communication interface unit area 7.

The three areas 6, 7 and 8 are supplied power by way of a mains connection unit 2 provided with the coarse protection stage A. As also described above, the mains connection unit 2 is supplied source power from an external power generating unit 15 via a line 16 and contains a mains box 3, an NEMP cable 4 and an interstage transformer 5. This main power supply is then distributed among the three areas 6, 7 and 8.

Physically, the area separation is accomplished by employing radio frequency (RF)-type power supply components, double shielded cables, filters and like measures in the design stage for the entire subsystem which is situated in the booth 1. The power supply lines are conducted from the mains box 3 by the interstage transformer 5, the alternating current switch and distributor 9 and from whence it is separately distributed to the three power line filters 10 and power supply units 22, 23 and 24 of the areas 6, 7 and 8, respectively. The power is distributed from the respective power line filters 10 to the supply units 22, 23 and 24 by means of double shielded cables 25 and separate cable ducts and channels. The device shielding houses are identified by the references 26 while the shielded housing to the booth 1 is identified by the reference numeral 27. The device shielding housings 26 in the exemplary embodiment have a minimum attenuation of 60 dB in the frequency range of 10 kHz to 10 GHz and an overall attenuation of at least 120 dB against radiant interferences arising from signals in the above-identified frequency ranges.

Although modifications and changes may be suggested by those skilled in the art, it is the intention of the inventors to embody within the patent warranted hereon all changes and modifications as reasonably and properly come within the scope of their contribution to the art.

I claim:

1. A power supply system for a communications subsystem of a weapons system, comprising:

a source of alternating current power external to the subsystem for supplying source power;

a mains connection in the subsystem which is electrically coupled to the external source of power;

a transformer electrically coupled to the mains connection;

a distributor electrically coupled to the transformer and configured to distribute power from the transformer into a plurality of sub-power lines;

a converter in each of the sub-power lines for converting the power supplied thereto into a DC power signal;

devices powered by the DC power signal coupled to the sub-power lines;

a first filter stage provided within the subsystem, the first filter stage having means for removing current surges and voltage surges in the source power and electromagnetic particle field influences in the mains connection and transformer;

a second filter stage comprising a power line filter positioned in each of the sub-power lines, the second stage filters isolating the various sub-power lines from one another; and a third filter stage comprising means for filtering noise signals and interfering signals from the various devices so that the devices are isolated from each other.

2. The power supply system of claim 1, wherein an inverter is connected in one of the sub-power lines following the converter.

3. The supply system of claim 1, wherein the third filter stage means for filtering noise signals and interference signals from the various devices from one another comprises low pass filters coupled in-line in the sub-power lines, inductances coupled in-line in the subpower lines and operatively coupled shunt capacitors and shunt resistors.

4. The supply system of claim 1, wherein the communication system is housed within a booth and the booth is divided into at least three sub-areas, each of the sub-power lines dedicated to supply DC power to a respective sub-area, the booth being constructed of a suitable shielding material that isolates the sub-area from external electro-magnetic influences, the devices being housed within suitable electro-magnetic shielding housings.

* * * * *